(No Model.)
R. D. LOOSE.
TRACK CLEARER FOR MOWERS.
No. 506,324. Patented Oct. 10, 1893.
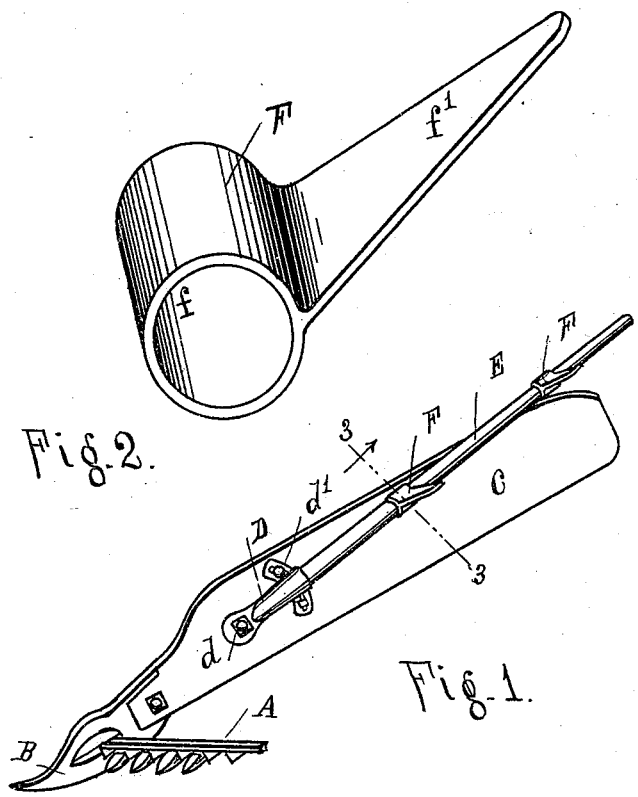
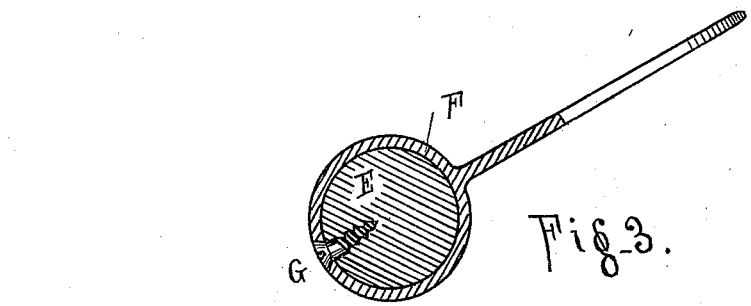
Witnesses
Tad A. Bailey,
Irving Barber
Robert D. Loose, Inventor
By his Attorney N. DuBois,

UNITED STATES PATENT OFFICE.

ROBERT D. LOOSE, OF SPRINGFIELD, ILLINOIS.

TRACK-CLEARER FOR MOWERS.

SPECIFICATION forming part of Letters Patent No. 506,324, dated October 10, 1893.

Application filed March 27, 1893. Serial No. 467,802. (No model.)

*To all whom it may concern:*

Be it known that I, ROBERT D. LOOSE, a citizen of the United States, residing at Springfield, in the county of Sangamon and State of Illinois, have invented a new and useful Track-Clearer for Mowers, of which the following is such a full, clear, and exact description as will enable those skilled in the art to which it appertains to make and use my said invention.

The purpose of my invention is to provide effective means whereby all of the grass cut by the mower may be thrown inward from the butt-board and deposited completely within the swath cut by the mower, so as to leave a clear track for the inside shoe of the mower on the next round, thus preventing the cut grass from straggling over the butt-board and falling on the uncut grass on the grain side of the mower. Cut grass straggling over the butt-board and falling on the standing grass as described presses down the uncut grass and causes it to tangle to such an extent that when the machine is cutting the next swath it frequently happens that the inside divider shoe of the mower fails to pick up all of the grass, and the result is that narrow strips of uncut and tangled grass are left extending across the field; this is wasteful and untidy and my improvement is intended to remedy this defect which is common to mowers as now ordinarily constructed.

In describing my invention reference is hereby made to the annexed drawings and the letters of reference marked thereon.

In the drawings:—Figure 1—shows the guide rod connected with the butt-board of the mower and the deflectors in position on the guide rod. Fig. 2—is an enlarged detached view of one of the deflectors. Fig. 3— is an enlarged vertical section on the line 3 of Fig. 1.

Similar letters indicate similar parts in all the views.

In the drawings I have shown only so much of the cutting apparatus and the dividing shoe of the mower as is necessary to illustrate the connection of the track clearer with the mower.

My device may be applied to any of the mowers in common use.

The cutting mechanism A, the divider shoe B, the butt-board C and the socket plate D are such as are commonly used and need not be described. The socket plate D is connected with the butt-board by means of a bolt $d$ on which the plate turns to permit the upward or downward adjustment of the guide rod E. When the rod is adjusted in any desired position, the plate is secured in that position by means of the bolt $d'$ in a manner well known. The guide rod E is of wood and its lower end is secured in the plate. One of the deflectors is clearly shown in Fig. 2. These deflectors consist of a main cylindrical part $f$ and an angular finger $f'$ integral therewith.

Two or more deflectors may be used on the guide rods, and in various positions to suit circumstances but in practice I have found that two deflectors in the position shown is a convenient number.

The deflectors are secured on the guide rods E by screws G or other suitable means. In operation as the mower moves foward the grass slides upward along the rod E until it comes in contact with the fingers $f'$ of the deflectors by which it is abruptly deflected from the butt-board C and falls to the ground leaving a clear track between the cut and the uncut grass. If the grass escapes the first deflector it will come in contact with and be deflected and turned down by the second. In practice I have found the device is effective as a means for producing a clear cut swath and preventing the untidy and wasteful strips of tangled and uncut grass heretofore described.

What I claim as my invention, and desire to secure by Letters Patent, is—

1. In a track clearer for mowers, a deflector consisting of a main cylindrical part adapted to fit on a guide rod, and an angular finger integral with said cylindrical part, as set forth and for the purpose stated.

2. In a track clearer for mowers, the combination of the socket plate, the guide rod having its lower end secured in the socket plate and the deflectors adjustably connected with the guide rods, as set forth and for the purpose stated.

3. In a track clearer for mowers, the combination of the butt-board, the guide rod having its lower end secured in the socket plate and the deflectors on the guide rod as set forth and for the purpose stated.

In witness whereof I have hereunto set my hand and signed my name, at Springfield, Illinois, this 10th day of March, 1893.

ROBERT D. LOOSE.

Witnesses:
N. Du Bois,
Tad A. Bailey.